United States Patent [19]

Heeger et al.

[11] Patent Number: 5,204,038

[45] Date of Patent: Apr. 20, 1993

[54] PROCESS FOR FORMING POLYMERS

[75] Inventors: Alan J. Heeger; Paul Smith, both of Santa Barbara, Calif.

[73] Assignee: The Regents of the University of California, Oakland, Calif.

[21] Appl. No.: 635,455

[22] Filed: Dec. 27, 1990

[51] Int. Cl.$^5$ .................. B29C 47/00; D01D 5/06; D01F 6/00

[52] U.S. Cl. .................. 264/184; 264/204; 264/205; 264/210.1; 264/210.8

[58] Field of Search .................. 264/171, 211, 211.14, 264/205, 210.1, 210.6, 210.8, 184, 204

[56] References Cited

U.S. PATENT DOCUMENTS 3,401,152 10/1968 Wessling et al. .
3,706,677 12/1972 Wessling et al. .
4,344,908 8/1982 Smith et al. .................. 264/205 X

OTHER PUBLICATIONS

Hotta et al. *Synth. Metals* 26:267–279 (1988).
Gagnon et al., *Amer. Chem. Soc. Polymer Preprints and Papers* 25:284–285 (1984).
Hotta et al., *Macromolecules* 20:212–215 (1987).
Momii et al., *Chemistry Letters* 7:1201–4 (1988).
Nowak et al., *Macromolecules* 22:2917–2926 (1989).
Yamada et al., *J. Chem. Soc., Chem. Commun.* 19:1448–9 (1987).
U.S. patent application Ser. No. 07/468,737 (filed Jan. 24, 1990).

*Primary Examiner*—Leo B. Tentoni
*Attorney, Agent, or Firm*—Morrison & Foerster

[57] ABSTRACT

Oriented conjugated polymer shaped articles can be formed by the process of (a) providing a carrier solution made up of
(i) carrier solvent,
(ii) nonconjugated flexible chain carrier polymer, and
(iii) conjugated polymer or conjugated polymer precursor;
(b) forming this carrier solution, before or after gelling the solution and removing solvent from it, thereby yielding a body having a first shape, and (c) anisotropically physically distorting the first shape of the body to yield the desired shaped article formed with an oriented structure in the carrier polymer and in the conjugated polymer. The orientation of the conjugated polymer leads to anisotropic absorption and photoluminescence properties for the shaped article.

11 Claims, 4 Drawing Sheets

PROCESS FOR FORMING POLYMERS

BACKGROUND OF THE INVENTION

Origin of the Invention

This work was supported by the Air Force Office of Scientific Research (AFOSR 90-0283). The U.S. Federal Government may have certain rights to this invention.

FIELD OF THE INVENTION

This invention relates to a method for processing polymers and to the polymers it produces. It concerns to a method for forming ordered polymers, more particularly, ordered conjugated polymers.

BACKGROUND INFORMATION

Conjugated polymers and conducting polymers based on them were discovered in the late 1970s. They offer unique optical (color) properties and the possibility of combining the important electronic and optical properties of semiconductors and metals with the attractive mechanical properties and processing advantages of polymers. However, the initial conjugated polymer systems were insoluble, intractable, and nonmelting (and thus not readily processable into oriented structure) with relatively poor mechanical properties.

In recent years, progress has been made toward specific conjugated polymer systems which are more soluble and thereby more processable. For example, the poly(3-alkylthiophene) derivatives (P3ATs) of polythiophene are soluble and meltable with alkyl chains of sufficient length, and the P3ATs have been processed into films and fibers See, e.g., Hotta, S., et. al., *Marcomolecules*, 20:212 (1987); Nowak, M., et. al., *Macromolecules*, 22:2917 (1989); Hotta, et. al., Synth. Met., 26:267 (1988). However, because of the moderate molecular weights and/or the molecular structures of these polymers, the mechanical properties (modulus and tensile strength) of fibers and films, etc., of the P3ATs are modest and limit their use.

Alternative methods of processing conjugated polymers have been developed. For example, conjugated systems based on poly(phenylenevinylene) ("PPV") and alkoxy derivatives of PPV have been synthesized via the "precursor polymer" route. See, for example, U.S. Pat. Nos. 3,401,152 and 3,706,677 to Wessling et. al.; Gagnon et. al., *Am. Chem. Soc. Polym. Preor.* 25:284 (1984); Momii et. al., *Chem. Lett.* 1201-4 (1988); and Yamada et. al., *JCS Chem. Commun.* 19:1448-9 (1987). In the first step of this route, a saturated precursor polymer is synthesized. The precursor polymer is soluble and can be processed into the desired final shape. The precursor polymer is thermally converted into the conjugated polymer during or after the forming into desired final shape. Tensile drawing can be carried out during the thermal conversion. Thus, significant chain extension and chain alignment of the resulting conjugated polymers can be achieved. Although the precursor polymer route may offer advantages, the multi-step synthesis is complex, makes the resultant materials relatively expensive, and limits their utility.

Commonly owned U.S. Pat. application Ser. No. 468,737, filed on Jan. 24, 1990, disclosed that shaped articles can be formed of composites of conjugated polymer and flexible-chain carrier polymers This earlier application is incorporated by reference. The process and articles of that invention seek to marry the desirable properties of conjugated polymers with the desirable properties of non conjugated polymers such as ultra-high molecular-weight poly(ethylene) "UHMW-PE".

UHMW-PE can be chain-extended and chain-aligned by first dissolving the polymer in an appropriate solvent at an elevated temperature, then forming a gel by cooling, and subsequently carrying out tensile drawing at selected conditions (temperature, time, etc.) to yield fibers and films etc. with outstanding mechanical properties.

U.S. Ser. No. 468,737 discloses that these properties are retained and that the conductive and optical properties of conjugated polymers can be gained by its composite systems.

We have now made further improvements to these non-conjugate/conjugate polymer composite systems and their preparation and processing.

REFERENCES

In the description of this invention note will be taken of the following references:

A.0. Patil, A. J. Heeger and F. Wudl, Chem. Rev. 88, 183 (1988).
2. R. Silbey, in "Conjugated Polymeric Materials: Opportunities in Electronics, Optoelectronics and Molecular Electronics", NATO ASI Series, Series E: Applied Sciences- Vol. 182, Ed. by J. L. Bredas and R. R. Chance; and references therein.
3. A. Andreatta, S. Tokito, P. Smith and A. J. Heeger, Mol. Cryst Liq. Cryst , 189, 169 (1990).
4. S. Kivelson and A. J. Heeger, Synth. Met. 22, 371 (1988).
5. F. Wudl and G. Srdanov (to be published).
6. P. Smith and J. Wittman, U.S. Pat. (filed).
7. P. Smith and P. Lemstra, J. Mater. Sci., 15, 505 (1980).
8. A. Fizazi, J. Moulton, K. Pakbaz, S. D. D. Rughooputh, Paul Smith and A.J. Heeger, Phys. Rev. Let. 64, 2180 (1990).
9. P. Smith, P. J. Lemstra, J. P. L. Pipers, and A. M. Kiel, Colloid and Polym. Sci 259, 1070 (1981).
10. J. Van Smoot and K. Voss (to be published).
T. Hagler, K. Pakbaz and A. J. Heeger (to be published).
12. L. S. Lauchlan, S. Etemad, T.-C. Chung, A. J. Heeger and A. G. MacDiarmid, Phys. Rev. B27, 2301 (1983).
3. K. Voss, C. M. Foster, L. Smilowitz, D. Mihailovic, S. Askari, G. Srdanov, Z. Ni, S. Shi, A. J. Heeger and F. Wudl, Phys. Rev. B (in press).
14. Y. Suzuki, P. Pincus and A. J. Heeger, Macromolecules 23, 4730 (1990).

DISCLOSURE OF THE INVENTION

It has now been found that oriented conjugated polymer shaped articles can be formed by the process of
(a) providing a carrier solution made up of
  (i) carrier solvent,
  (ii) nonconjugated flexible chain carrier polymer, and
  (iii) conjugated polymer or conjugated polymer precursor;
(b) forming this carrier solution, before or after gelling the solution and removing solvent from it, thereby yielding a body having a first shape, and
(c) anisotropically physically distorting the first shape of the body to yield the desired shaped article formed with an oriented structure in the carrier polymer and in the conjugated polymer. The orientation of the conjugated polymer leads to anisotropic absorption and photoluminescence properties for the shaped article.

In preferred embodiments the distorting is carried out by drawing, particularly to very high draw ratios (greater than 30 and often up to as much as 200 or more).

In other aspects, this invention provides the anisotropic oriented conjugated polymer products which this process makes possible.

DETAILED DESCRIPTION OF THE INVENTION

Brief Description of the Drawings

This invention will be further described with reference being made to the drawings in which.

MODES FOR CARRYING OUT THE INVENTION

In essence, the method of the present invention involves four steps: (a) the dissolution of the appropriate carrier polymer and either a soluble conjugated polymer or a soluble precursor to a conjugated polymer, in a suitable carrier solvent; (b) the preparation of a shaped article from the polymer solution by forming and removing solvent; (c) the gelling of the polymer solution either before or after it is formed into the shaped article and (d) the anisotropic distorting of the shaped article through tensile drawing or like process to chain-extend or chain-align the carrier polymer, and to chain-extend and chain-align the conjugated polymer as well. Where a precursor is used in step (a) (for example, in the route to PPV and its derivatives), the tensile drawing at a predetermined selected temperature during step (c) also serves to convert the precursor polymer to the conjugated polymer. The articles formed by the present process—typically fibers, rods tapes, or films or the otherwise colorless and insulating carrier polymer—can be rendered electrically conductive by doping, exhibit excellent mechanical properties, and may or may not be colored.

A. DEFINITIONS

A "shaped article" as used herein is intended to means a mechanically coherent object having a defined form, for example, a fiber, rod, film, or tape. The inventiveness of the present process lies in the ability to form shaped articles (by means of solution processing) of polymers such as UHMW PE which can be electrically conductive and exhibit anisotropic absorption and emission spectra.

A "conjugated" polymer as sued herein means a polymer having a pi electron network which allows for electron transfer substantially throughout its molecular structure. Conjugated polymers are typically highly colored because of the strong absorption associated with the pi-pi transition; the color, if any will depend on the specific polymer, for the energy of the pi-pi transition is determined by the polymer structure.

A "precursor" polymer as used herein is a partly saturated polymer which can be converted to a final conjugated polymer by thermal treatment or by chemical treatment, or both. The precursor polymer is soluble in common solvents, whereas the converted conjugated polymer is either not soluble in such solvents or much less soluble than the precursor polymer.

A polymer "composite" or "blend" as used herein means a structural mixture of two or more polymeric materials which may or may not be covalently bound to one another.

A "oriented" material as used herein is intended to mean a polymeric structure in which individual polymeric chains are substantially linear and parallel.

General, "flexible chain" polymers are structures which allow for more variation in bending angle along the chains (characteristic ratio Coo typically less than 10), while "rigid rod" polymers tend to be straighter and more highly oriented (characteristic ratio Coo typically greater than about 100). See P. J. Flory, Statistical Mechanics of Chain Molecules, N.Y., Wiley & Sons Interscience, 1969, p. 11.

By "substantially nonconducting" as used herein to describe the carrier polymer is meant a conductivity of less than about 0.1 S/cm and preferably less than 0.05 S/cm.

The conductivity of the conductor composite materials provided and described herein is given as the conductivity after doping, i.e., during or after preparation of the composite as described herein, the material is rendered conductive by either p-type (oxidative) or n-type (reductive) doping using standard dopants and techniques.

B. CARRIER SOLUTIONS i. Carrier Polymers

The criteria for the selection of the carrier polymer are as follows. The polymer is preferably a substantially nonconducting, flexible-chain polymer which allows for the formation of mechanically coherent structures (fibers, films, rods, tapes, etc.) at low concentrations, and which is stable with respect to the solvent used in processing. Low concentrations of carrier polymer are preferred in order to minimize processing difficulties, i.e., excessively high viscosity or the formation of gross inhomogeneities; however, the concentration of the carrier should be high enough to allow for formation of coherent structures. Preferred carrier polymers are high molecular weight (molecular weight greater than about 100,000, more preferably greater than about 500,000) flexible-chain polymers, such as polystyrene and polytetrafluoroethylene, and the like, and particularly preferred carrier polymers are polyethylene and polypropylene. Under appropriate conditions, which can be readily determined by those skilled in the art, these macromolecular materials enable the formation of coherent structures from a wide variety of liquids, including water, acids, and numerous polar and nonpolar organic solvents. Structures manufactured using these carrier polymers have sufficient mechanical strength at polymer concentrations as low as 1%, even as low as 0.1%, by volume, to enable forming into the desired first shape. Mechanically coherent structures can also be prepared from lower molecular weight flexible chain polymers, but generally, higher concentrations of these carrier polymers are required. Higher concentrations may have an undesirable effect on the drawability and properties of the final products.

Selection of the carrier polymer is made primarily on the basis of compatibility of the final conducting polymer and its reactants, as well as with the solvent or solvents used. For example, blending of polar conducting polymers generally requires carrier structures that are capable of codissolving with or absorbing polar reactants. Examples of such coherent structures are those comprised of poly(vinyl alcohol), poly(ethylene oxide), poly-para(phenylene terephthalate), poly-para-benzamide, etc., and suitable liquids. On the other hand, if the blending of the final polymer cannot proceed in a polar environment, nonpolar carrier structures are selected, such as those containing polyethylene, polypropylene, polybutadiene, and the like.

It should of course be noted that more than one carrier polymer may be used to form the carrier solution and ultimately become a part of the final composite; i.e., mixtures of two or more carrier polymers may be incorporated into the initial carrier solution ii. The Carrier Solvent

The carrier solvent is one in which the carrier polymer is substantially soluble and one which will not interfere with the subsequent admixture with the conjugated polymer, gellation and formation into the first body.

Typically, organic solvents are used. These can include halohydrocarbons such as methylene chloride, chloroform, and carbon tetrachloride, aromatic hydrocarbons such as xylene, benzene, toluene, other hydrocarbons such as decaline; ethers such as THF, and the like. Mixed solvents can be used, as well. Depending upon the nature of the carrier polymer, polar solvents such as water, acetone, acids and the like may be suitable. These are merely a representative exemplication and the solvent can be selected broadly from materials meeting the criteria set forth above.

iii. The Conjugated Polymer

The conjugated polymers used herein include the wide range of conjugated polymers known in the art. These include, for example, poly(2-methoxy,5-(2'-ethylhexyloxy)-P-phenylene vinylene) or "MEH-PPV", a material described in a copending patent application filed on Dec. 17, 1990 by Wudl et. al.; poly(3-alkylthiophenes) (where alkyl is from 6 to 16 carbons) such as poly(2,5-dimethoxy-p-phenylene vinylene)-"PDMPV", and poly(2,5-thienylenevinylene); poly(3-octylthiophene) poly(3-decylthiophene) and poly(3-dodecylthiophene); poly(phenylenevinylene) or "PPV" and alkoxy derivatives thereof.

iv. Relative Amounts in Carrier Solution

Turning now to the issue of concentration, it is of crucial importance that the first structure as formed have sufficient mechanical coherence for further handling during the formation of the final polymer blend. Therefore, the initial concentration of the carrier polymer generally is selected above 0.1% by weight, and preferably above about 0.2% by weight, basis solvent and more preferably from about 0.2% by weight to about 60% by weight. More preferably, the concentration of the carrier polymer in the initial solution is from about 0.2% by weight to about 10% by volume. The final composite is one in which the conjugated polymer represents at least about 0.1 wt.% of the total polymer in the composite, more preferably from about 0.2 wt.% to about 90 wt.%, most preferably from about 0.5 wt.% to about 25 wt.%. The concentration of conjugated polymer (or precursor) in the carrier solution should be set to provide this relationship with the carrier polymer.

At lower concentrations of total polymer, such as 0.2% to about 10%, the polymer chains are in a less tangled state which can be advantageous when making highly aligned, linear structures.

C. The Forming Step

The carrier solution is formed into a selected shape, e.g., a fiber, tape, rod, film or the like, by extrusion or by any other suitable method. The solvent is then removed (through evaporation, extraction, or any other convenient method).

D. The Gelation Step

Gels can be formed from the carrier solution in various ways, e.g., through chemical crosslinking of the macromolecules in solution, swelling of crosslinked macromolecules, thermoreversible gelation, and coagulation of polymer solutions. In the present invention, the two latter types of gel formation are preferred, although under certain experimental conditions, chemically crosslinked gels may be preferred.

Thermoreversible gelation refers to the physical trans formation of polymer solution to polymer gel upon lowering the temperature of a homogeneous polymer solution (although in exceptional cases a temperature elevation may be required). This mode of polymer gelation requires the preparation of a homogeneous solution of the selected carrier polymer in an appropriate solvent according to standard techniques known to those skilled in the art. The polymer solution is cast or extruded into a fiber, rod, or film form, and the temperature is lowered to below the gelation temperature of the polymer in order to form coherent gels. This procedure is well known and is commercially employed, e.g., for the formation of gels of high molecular weight polyethylene in decalin, paraffin oil, oligomeric polyolefins, xylene, etc., as a precursor for high-strength polyolefin fibers and films.

"Coagulation" of a polymer solution involves contacting the solution with a nonsolvent for the dissolved polymer, thus causing the polymer to precipitate. This process is well known, and is commercially employed, for example, in the formation of rayon fibers and films, in the spinning of high-performance aramid fibers, etc.

The gelation step can be carried out before, during, or after the "Forming Step".

E. The Distortion Step

The carrier polymer/conjugated polymer or precursor composite after forming into an initial shaped article is subjected to mechanical deformation, typically by stretching at least about 100% in length, after the initial forming step. Deformation of polymeric materials is carried out in order to orient the macromolecules in the direction of draw, which deformation results in improved mechanical properties. Maximum deformation of thermoreversible gels are substantially greater than melt processed materials. (P. Smith and P. J. Lemstra, Colloid and Polym. Sci., 258:891 (1980). The large draw ratios possible with thermoreversible gels are also advantageous if composite materials may be prepared with materials limited in their drawability due to low molecular weights. In the case of conducting polymers, not only do the mechanical properties improve, but, more importantly, the electrical conductivity also often displays drastic enhancement upon tensile drawing.

In accord with the present invention, the carrier/conjugate formed articles are typically subjected to substantial deformation such as a draw ratio (final length:initial length) of at least about 1:1 and preferably at least 30:1 and more preferably at least 50:1. This drawing has the effect of physically orienting not only the carrier molecules but also The molecules of conjugated polymers. This leads to previously undetected advantages such as anisotropic optical and electrical properties, for the carrier/conjugate composites as a whole.

This invention will be further described by the following examples. These are not to be construed as limiting the scope of the invention defined by the appended claims.

EXAMPLE 1

This example involves the preparation and testing of a highly distorted polymer composite made up of 99% ultra-high molecular weight polyethylene and 1% conjugated polymer, poly(2-methoxy,5-(2'ethyl-hexyloxy)-MEH-PPV Synthesis:

R = —CH$_3$, —CH$_2$CH$_3$, —CH(CH$_3$), etc.

-continued
Scheme 1:
R' = —(CH$_2$)$_n$CH$_3$, —CH$_2$C$_6$H$_4$(CH$_2$)$_n$X
(X = group compatible with PPV polymerization;
e.g., OCH$_3$, CH=CH$_2$, C≡CH)
a, YCH$_2$R'R (Y = leaving group, Cl, Br, I, OTs, etc)/EtOH;
b, CH$_2$O/HCl; c, t-BuOK/THF

Monomer synthesis

1. Preparation of 1Methoxy-4-(2-Ethyl-Hexyloxy)Benzene

A solution of 24.8 g (0.2 mole) of 4-methoxy phenol in 150 mL dry methanol was mixed under nitrogen with 1.5 M solution of sodium methoxide (1.1 equivalent) and refluxed for 20 min. After cooling the reaction mixture to room temperature, a solution of 2-ethylbromohexane (42.5 mL, 1.1 equivalent) in 150 mL methanol was added dropwise. After refluxing for 16 h, the brownish solution turned light yellow. The methanol was evaporated and the remaining mixture of the white solid and yellow oil was combined with 200 mL of ether, washed several times with 10% aqueous sodium hydroxide. H$_2$O and dried over MgSO$_4$. After the solvent was evaporated, 40 g (85%) of yellow oil was obtained. The crude material was distilled under vacuum (2.2 mm Hg, b.P. 148°–149° C.), to give a clear, viscous liquid. $^1$H NMR (CDCl$_3$) 6.98 (4H, s, aromatics), 3.8 (5H, t, O-CH$_2$, O-CH$_3$), 0.7–1.7 (15 H, m, C$_7$H$_{15}$). IR (NaCl plate) 750, 790, 825, 925, 1045, 1105, 1180, 1235, 1290, 1385, 1445, 1470, 1510, 1595, 1615, 1850, 2030, 2870, 2920, 2960, 3040. MS. Anal. Calc. for C$_{15}$H$_{24}$O$_2$: C, 76.23; H, 10.23; O, 13.54. Found: C, 76.38, H, 10.21; O, 13.45.

2. Preparation of 2,5-bis(Chloromethyl)-1-Methoxy-4-(2-Ethyl-hexyloxy)Benzene To the solution of 4.9 g (20.7 mmoles) of compound (1) in 100 mL p-dioxane cooled down to 0°–5° C., 18 mL of conc. HCl, and 10 ml of 37% aqueous formalin solution was added. Anhydrous HCl was bubbled for 30 min, the reaction mixture warmed up to R. T. and stirred for 1.5–2 h. Another 10 mL of formalin solution was added and HCl gas bubbled for 5–10 min at 0°–5° C. After stirring at R. T. for 1 h, this step was repeated 2–3 times, and the reaction mixture continued to stir at R. T. for 16 h, and then refluxed for 3–4 h. After cooling and removing the solvents, an off-white "greasy" solid was obtained. The material was dissolved in a minimum amount of warm hexanes and precipitated by adding methanol until the solution became cloudy. After cooling, filtering and washing with cold methanol, 3.4 g (52%) of white crystalline material (mp 52°–54° C.) was obtained. $^1$H NMR (CDCl$_3$) 6.98 (2H, s, aromatics), 4.65 (4H, s, CH$_2$-Cl), 3.86 (5H, t, O-CH$_3$,O-CH$_2$), 0.9–1.5 (15H, m, C$_7$H$_{15}$). IR (KBr) 610, 700, 740, 875, 915, 1045, 1140, 1185, 1230, 1265, 1320, 1420, 1470, 1520, 1620, 1730, 2880, 2930, 2960, 3050. MS. Anal. Calc. for C$_{17}$H$_{26}$O$_2$Cl$_2$: C, 61.26; H, 7.88; O, 9.60; Cl, 21.27. Found: C, 61.31; H, 7.74; O, 9.72; Cl, 21.39.

Polymerization

Preparation of Poly(1-Methoxy-4-Ethylhexyloxy-2,5-phenylenevinylene) MEH-MPV

To a solution of 1.0 g (3 mmol) of 2,5-bis(chloromethyl)-1-methoxy-4-(2-ethylhexyloxy)benzene in 20 mL of anhydrous THF was added dropwise a solution of 2.12 g (18 mmol) of 95% potassium tert.-butoxide in 80 mL of anhydrous THF at room temperature with stirring. The reaction mixture was stirred at ambient temperature for 24 hr and poured in 500 mL of methanol with stirring. The resulting red precipitate was washed with distilled water and reprecipitated from THF/methanol and dried under vacuum to afford 0.35 g(45% yield). UV (CHCl$_3$) 500. IR (film) 695, 850, 960, 1035, 1200, 1250, 1350, 1410, 1460, 1500, 2840, 2900, 2940, 3040. Anal. Calc. for C$_{17}$H$_{24}$O$_2$: C, 78.46, H 9.23. Found: C, 78.34; H, 9.26.

Molecular weight (GPC vs polystryene) $3 \times 10^5$. Inherent viscosity ~5dl/g, (but time dependent due to the tendency to form aggregates). As is the case with a few other stiff chain polymers, the viscosity increases with standing, particularly in benzene. The resulting solution is therefore thixotropic.

The conjugated polymer is highly colored (bright red-orange).

Synthesis of MEH-PPV by the Precursor Route—Preparation of the Precursor Polymer and Conversion to MEH-PPV Scheme 2:

R = CH$_2$CH(CH$_2$CH$_3$)C$_4$H$_9$;
a, R—Cl, MeO$^{(-)}$Na$^{(+)}$/MeOH; b, CH$_2$O.H$_3$O$^+$Cl$^-$/dioxane;
c, THT/MeOH; d, NaOH/MeOH; e, $\Delta$/1,2,4-trichlorobenzene.

Monomer Synthesis

The monomer synthesis is exactly the same as n Scheme 1.

Polymerization of the Precursor Polymer and Conversion to MEH-PPV

A solution of 200 mg (0.39 mmol) of the monomer salt (2) (6) in 1.2 mL dry methanol was cooled to 0° C. for 10 min and a cold degassed solution of 28 mg (1.7 equivalents) of sodium hydroxide in 0.7 mL methanol was added slowly. After 10 min the reaction mixture became yellow and viscous. The above mixture was maintained at 0° C. for another 2-3 h and then the solution was neutralized. A very thick, gum-like material was transferred into a Spectrapore membrane (MW cutoff 12,000–14,000) and dialysed in degassed methanol containing 1% of water for 3 days. After drying in vacu, 70 mg (47%) of "plastic" yellow precursor polymer material was obtained. UV (CHCl$_3$)365. IR (film) 740, 805, 870, 1045, 1100, 1125, 1210, 1270, 1420, 1470, 1510, 2930, 2970, 3020. Soluble in C$_6$H$_5$Cl, C$_6$H$_3$Cl$_3$, CH$_2$Cl$_2$, CHCl$_3$, Et$_2$O, THF. Insoluble in MeOH.

The precursor polymer was converted (step e of the Scheme) to the conjugated MEH-PPV by heating to reflux (approx. 214° C.) in 1,2,4-trichlorobenzene solvent. The product was identical with the material obtained in Scheme 1.

Carrier Solution Preparation, Article Formation, Gelation, and Drawing

PE-MEH-PPV blends were prepared by mixing 7.5 mg of MEH-PPV (M$_w$=450,000) in xylene with 0.75 of UHMW polyethylene (Hostalen GUR 415; M$_w$=4$\times$10$^6$) in xylene such that the PE to solvent ratio was 0.75% by weight. This solution was thoroughly mixed and allowed to equilibrate in a hot oil bath at 126° C. for one hour. The solution was then poured into a glass container to cool, forming a gel which was allowed to dry (into a film) for several days. Films were then cut into strips and tensile srawn over a hot pin at 100°–120° C. Once processed in this manner, the films are extremely durable; repeated thermal cycling and constant exposure to air caused no ill effects. This is presumably due to a combination of the stability of MEH-PPV and to the self-encapsulation advantage of utilizing polymer blends.

The spectra were measured with a 0.3 meter single grating monochrometer, and a mechanically chopped tungsten-halogen light source (resolution at the exit slits was 1.0 nm); light was detected by a photomultiplier tube (Mamamatsu R372), and the output was sent to a lock-in amplifier. The samples were mounted on sapphire substrates which were fit into a copper sample holder and mounted on the cold finger of a vacuum cryostat. To study the polarization dependence of anisotropic absorption, a dichroic sheet polarizer (MB 03 FPG 005) was inserted (on a driven rotational stage) just before the sample. Because of the dilution (1% conjugated polymer) of the gel-processed films, the index is dominated by that of PE s that the reflection losses were limited to a few percent even for relatively thick samples with moderate optical density. Thus, the absorption coefficients, parallel and perpendicular to draw axis, were accurately determined after correcting for the background with a blank substrate. For the photo-luminescence (PL) measurements, the sample was excited by a polarized, mechanically chopped (400 Hz) AR$^+$—ion laser (Coherent model 70) beam tuned to 457.9 nm. To determine the polarization, the polarizer was placed at the entrance slit of the monochrometer. All PL spectra were corrected by replacing the sample with an NBS referenced lamp. Absorption spectra were monitored before and after luminescence rums to insure against optical damage.

Figure 1:
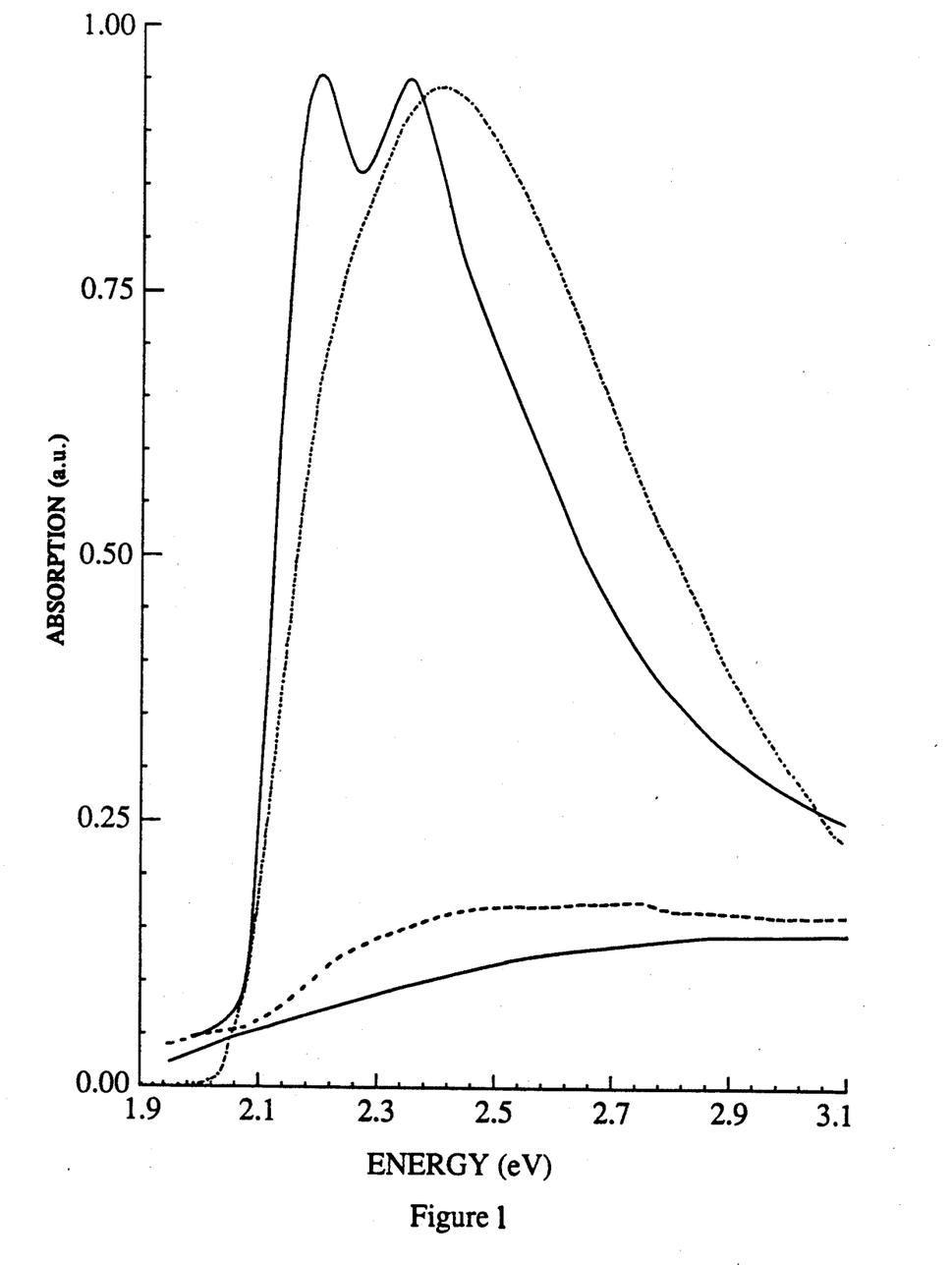
FIG. 1 is a graph showing anisotropic absorption for an oriented film at a draw ratio of about 50 of PE/-MEH-PPV for polarization both parallel to (solid) and perpendicular to (dashed) the draw axis and for a spin-cast film (dot-dashed), all at 80K. The scattering loss from a UHMW-PE film of comparable thickness and draw ratio is shown (dotted) for comparison).

The absorption spectra for an oriented free standing film (50:1 draw ratio) of PE/MEH-PPV are shown in FIG. 1 for polarization dependence of anisotropic photoluminescence, the polarizer was placed a the entrance slit of the monochrometer. All PL spectra were corrected by replacing the sample with an NBS referenced lamp. Absorption spectra were monitored before and after luminescence runs to insure against optical damage.

The absorption spectra for an oriented free standing film (50:1 draw ratio) of PE/MEH-PPV are shown in FIG. 1 for polarization both parallel to and perpendicular to the draw axis and for a spin-cast film (both at 80K); a high degree of macroscopic orientation of the conjugated polymer has been achieved by tensile drawing the gel-processed blend. Moreover, absorption parallel shows a distinct red shift, a sharper absorption onset, and a reduced total band-width compared to the absorption for the spin-cast film. These features, together with the appearance of revolved vibronic structure indicate a significant improvement in the structural order of the conjugated polymer in the oriented blend. The spectra of FIG. 1 were scaled (for comparison) to that of the absorption parallel which has a maximum value of $2.2 \times 10^3$ cm$^{-1}$ at 2.2 eV (1% MEH-PPV in The transverse "absorption" in FIG. 1 is dominated by scattering from residual microstructure in the PE. This is demonstrated by comparing the absorption perpendicular with the artificial "absorption", due to residual scattering, obtained from an undecorated UHMW-PE film of comparable thickness and draw ratio; the initial slope is the same and the overall spectral shape is similar. To circumvent the problem of residual scattering, the dichroism of selected IR-active modes associated with MEH-PPV have been studied as a function of the draw ratio; the dichroic ratio continues to improve monotonically with draw rates to absorption parallel/absorption perpendicular greater than 100.

The PE scattering was investigated by passing a He-Ne laser (632.8nm) through the various samples and examining the speckle pattern. For oriented samples, analysis of the pattern indicates that the scattering is from elongated microstructure with length (along the draw ratio) more than 100 times the wavelength and diameter less than one-tenth of the wavelength (details will be reported in a separate publication). Efforts are underway to modify the gel-processing to reduce the scattering by the oriented film.

Figure 2:
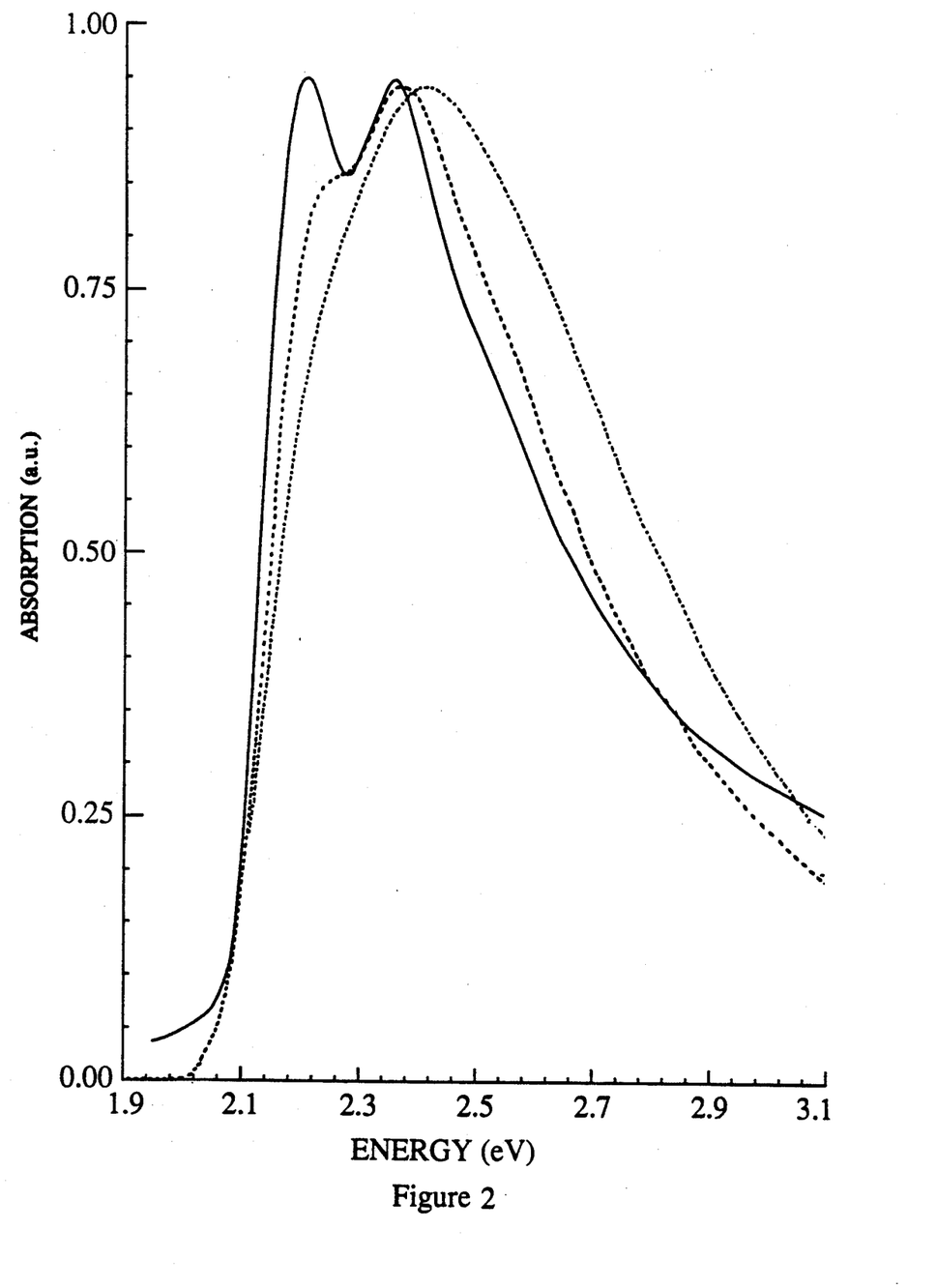
FIG. 2 is a graph showing anisotropic absorption for a nonoriented free-standing film of PE/MEH-PPV (dashed), absorption parallel to draw axis of the oriented film of PE-MEH-PPV (solid), and anisotropic absorption of the spin-cast film (dot-dashed) all at 80K.

FIG. 2 compares absorption coefficients of a nonoriented free-standing film of PE/MEH-PPV, of the oriented film of PE/MEH-PPV parallel to draw axis, and of the spin-cast film (all at 80K). The spectrum obtained from the nonoriented blend is intermediate between that of the spin-cast film and the oriented blend; it shows the red shift, the sharper absorption onset, the reduced total band-width and the emergence of vibronic structure Thus, even in the nonoriented blend, the MEH-PPV spectra are, in every way, consistent with a significant enhancement of microscopic order. Comparison of the absorption of the oriented film of PE/MEH-PPV with the absorption of the nonoriented film of PE/MEH-PPV shows that there is a sharpening of all spectral features and a clear redistribution of spectral weight into the zero-phono line (i.e. the direct photo-production of a polaron-exciton in its vibrational ground state). The data thus indicate a further enhancement of structural order by tensile drawing.

Figure 4:
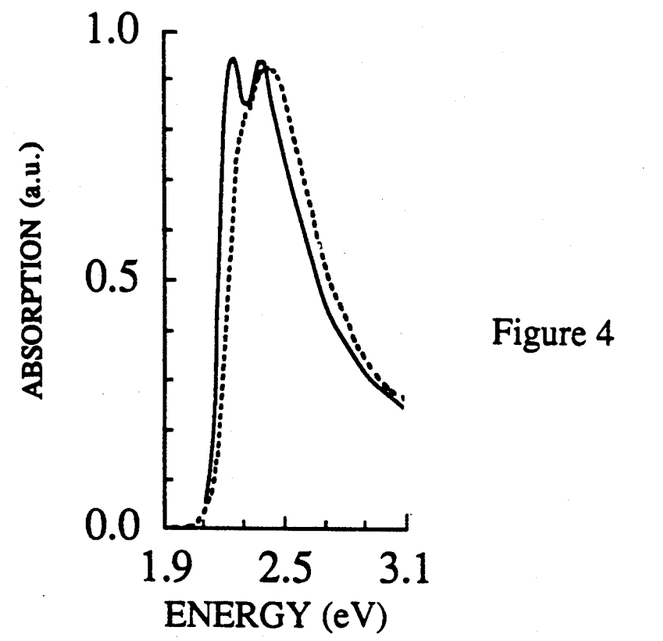
FIG. 4 compares absorption parallel to draw axis of the oriented film at 80K (solid) and at 300K (dashed).

FIG. 4 compares the absorption parallel to draw of an oriented free standing film of PE/MEH-PPV at 80K with that at 300K. AS the temperature (T) is raised, the peak shifts (thermochroism), the onset of absorption broadens and there is both an overall loss of resolution as well as a clear redistribution of spectral weight out of the lowest energy vibronic feature. The changes in absorption at 300K are indicative of increased disorder, in many ways similar to the changes induced by the structural disorder of the spin-cast films.

Figure 3:
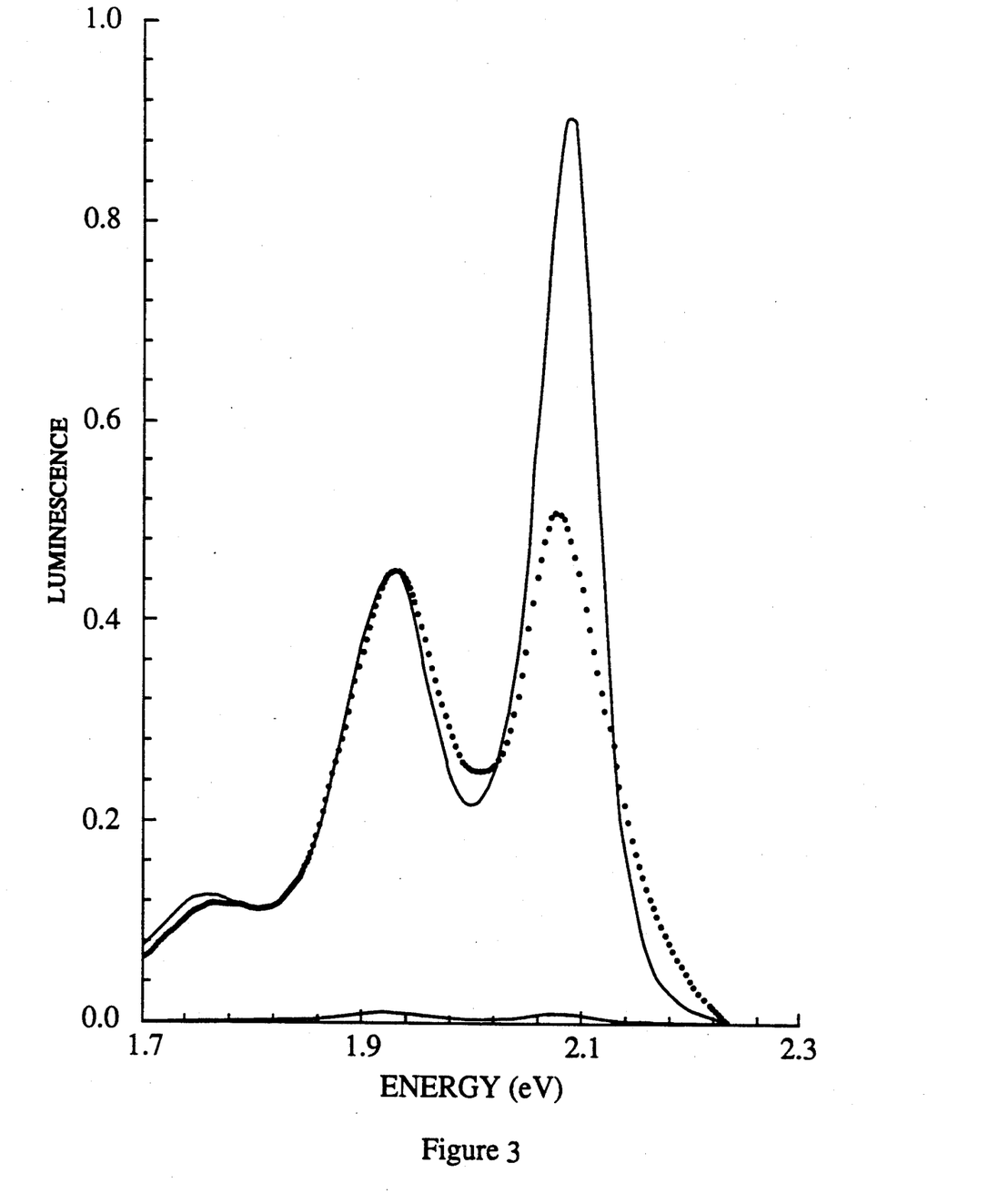
FIG. 3 is a graph depicting Anisotropy in the 80K photo-luminescence spectrum, from an oriented film of PE-MEH-PPV for parallel pumping; the upper solid curve is photo-luminescence spectrum parallel to draw axis; the lower solid curve is photo-luminescence spectrum perpendicular to draw axis; the dotted curve is photoluminescence spectrum perpendicular to draw axis scaled (times 30) for clarity.
Figure 5:
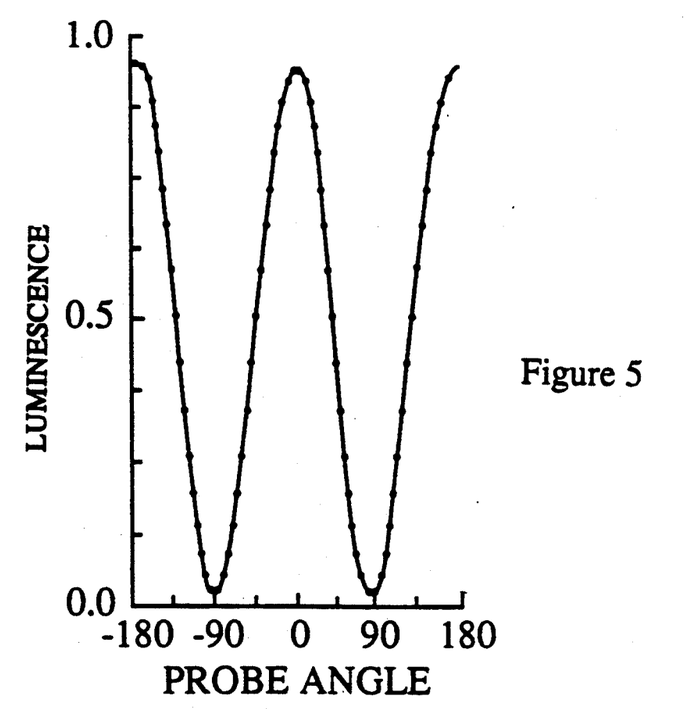
FIG. 5 shows the dependence of photo-luminescence spectrum on the polarization angle relative to the chain axis (the solid curve is a fit to $COS^2\theta$).

FIG. 3 demonstrates the anisotropy in the 80K emission spectrum, $L(\omega)$ of an oriented free standing film of PE/MEH-PPV for parallel pumping. FIG. 5 displays the polarization dependence of $L(\omega)$ measured at the zero-phono line (2.091 eV). The residual scattering sets a lower limit on this anisotropy of $L(\omega)$ parallel/$L(\omega)$ perpendicular greater than 60 with the preferred direction parallel to the draw axis. In addition to being much weaker, the $L(\omega)$ measured perpendicular shows relatively less spectral weight in the zero-phono line, consistent with a higher degree of disorder in the residual nonoriented material. For perpendicular pumping, the anisotropy ($-30:1$) and spectral features were similar, but with the intensity of the parallel emission reduced by about a factor of four. To our knowledge, this is the first observation of truly anisotropic emission (magnitude and lineshape) in a conjugated polymer system.

The polarized nature of $L(\omega)$ implies that the emission is from neutral bipolaron excitons (formed from positive and negative polarons) localized on MEH-PPV chains. This is particularly significant since the energy of the pump (457.9 nm) is sufficient for charge separation and polaron formation. Even with a perpendicularly polarized pump, $L(\omega)$ is polarized along the chain direction, implying that polarons on separate chains migrate until an oppositely charged polaron is encountered on the same chain. The relatively large confinement energy of the PPV structure may be responsible for efficient formation of such neutral bipolaron excitons.

We conclude that the MEH-PPV is chain extended and ordered by the gel-processed PE, with macroscopic chain alignment and improved order induced by tensile drawing. Since there is evidence from the earlier studies of such gels that the conjugated polymer adsorbs onto the PE and decorates the complex surface of the self-assembled PE network, we suggest that the conjugated polymer is oriented (and ordered) by a mesoscale epitaxy on the internal PE surfaces; i.e. mesoepitaxy. There are two observations which imply alignment by mesoepitaxy. First, there is spectroscopic evidence of improved order in the PE/MEH-PPV blends even prior to tensile drawing (see FIG. 2). This is consistent with mesoepitaxial adsorption of the conjugated macromolecules onto the lamellar PE crystallites within the gel. Second, when MEH-PPV is cast onto a film of pure UHMW-PE which has been stretched to a moderate draw ratio (e.g. draws >20), the MEH-PPV is observed to spontaneously orient along the draw direction. This characteristic feature of mesoepitaxy was first observed for polyaniline when brought out of solution (from sulfuric acid) onto a surface coated with an extremely thin (<100Å) oriented poly (tetrafluoroethylene film.

During the tensile drawing of gel-processing PE fibers and films, there are several stages of evolution of the microstructure. Initially, the lamellar PE crystals are simply aligned without a significant change in the amorphous fraction. At higher draw ratios, the lamellar crystals are pulled apart and chain extended; simultaneously, the amorphous interconnecting regions are chain extended and chain aligned leading to an overall degree of chain extension, chain alignment and interchain coherence that approaches the order in a single crystal. FIGS. 1 and 2 demonstrate that throughout this process, the conjugated chains (in the blend) are ordering and aligning on the evolving internal surfaces of the PE.

The fact that the alkyl side-chains on the MEH-PPV are ethylene-like may serve to enhance the interfacial interaction. There is evidence that adsorption of the MEH-PPV onto the PE surface is energetically favored over dissolution in the solvent; the small amount of solvent which is expelled during processing is only very lightly colored. We note, in this context, that we have been able to achieve similar results with poly(3-octylthiophene) through gel-processing with PE.

In summary, we have demonstrated a novel method for obtaining highly aligned and structurally ordered conjugated polymers by meso-scale spitaxy using gel processing in blends with PE and subsequent tensile drawing. By controlling the concentration of conjugated polymer in the blend, we have obtained highed aligned, durable samples with controlled optical density This allows the direct observation of the spectral changes that occur as a result of the improved structural order induced by mesoepitaxial alignment of the conjugated macromolecules. The details of the spectral changes (sharper absorption edge and enhancement of the zero-phonon vibronic transition) imply a significant increase of the localization length. The photo-luminescence spectrum is polarized ($>60$:1) indicative of emission from bipolaron excitons localized on the ordered and aligned chains. Experiments are in progress to determine the effect of the improved order and the implied delocalization (which profoundly affect the linear optical properties) on the nonlinear optical properties.

These results serve to confirm the importance of conjugated polymers as materials with potentially useful linear and nonlinear optical properties which result from the relatively broad energy bands and the strong pi-pi* interband transition which are characteristic of these semiconducting polymers. Patil, et. al. The implied delocalization of the pi*-electrons provides a mechanism for relatively high carrier mobilities upon doping or photoexcitation.

Delocalization of the electronic wavefunctions in conjugated polymers (and oligomers) leads to a large third order nonlinear optical susceptibility, $X^3$. Calculations predict a dramatic increase in the nonlinear optical response with chain length; the results indicate that $X^3$ is proportional to $N^v$ where N is the polymerization index, and v is in the range 4-5 (the precise value is sensitive to the detailed approximations in the method used). (Silbey) Since $X^3$ is an intrinsic quantity, it must saturate to a finite value in the thermodynamic (long chain) limit. The calculations imply, however, that this saturation does not occur until N reaches values of order $10^2$; thus, remarkable enhancements of $X^3$ are expected (per monomer) for conjugated macromolecules compared with those of the corresponding short oligomers. However, because of the well-known tendency for localization of the electronic wavefunctions in quasi-one-dimensional systems, the actual localization length, L(E), may in fact be much less than the chain length, particularly at energies, E, close to the band edge where the localization lengths limited by disorder are particularly small. This same disorder-induced localization is responsible for the modest electrical conductivities in all but the most highly ordered samples of doped conducting polymers (Anreatta, et. al.; and, Kiveloon, et. al.). It is clear, therefore, that there is a scientific and technological need for the optical quality thin films of aligned and highly ordered conjugated polymers which this invention provides.

The polarized absorption and emission spectra from a conjugated polymer blended into UHMW-PE and oriented by gel-processing have been determined. By varying the draw ratio and the concentration of conjugated polymer in the blend, the optical dichroism and the optical density can be independently controlled, thus, providing the opportunity to obtain anisotropic pi-pi* absorption spectra and anisotropic emission spectra for highly aligned samples of poly(2-methoxy, 5-(2'-ethyl-hexyloxy)-p-phenylene vinylene), MEH-PPV and other soluble conjugated polymers. The results indicate that gel processing causes a reduction in disorder through mesoepitaxy; an epitaxial orientation of the MEH-PPV on the internal surfaces of the gel-processed PE.

The simplest method of achieving chain extension and chain orientation of a polymer is by tensile drawing. Unfortunately, the relatively high density of entanglements present in most polymers limits the available draw ratios to modest values. A principal advantage of gel processing is that because of the dilution of the polymer in the gel (e.g. UHMW-PE form s gels at volume fractions even below 1%), the density of entanglements is far lower than in polymers prepared from the melt, etc. Moreover, the low entanglement density remains even after removing the solvent. Thus such gels (or gel-processed films and fibers) can be tensile drawn to remarkable draw ratios such as 200:1 during which the macromolecules are chain extended and aligned.

We have shown that a high degree of structural order is achieved through gel-processing which is transferred to a conjugated polymer in a UHMW-PE blend. On first thought, this would seem unlikely, for the two component polymers are typically incompatible (since the entropy of mixing is necessarily small for macromolecules). However, there is evidence of a strong interfacial interaction when conjugated polymers are added to a UHMW-PE gel; the frequency dependent conductivity results suggest that the conjugated polymer adsorbs onto the PE and decorates the complex surface of the gel network, thereby forming connected (conducting) pathways at volume fractions nearly three orders of magnitude below the threshold for three-dimensional percolation. The implied strong interfacial interaction suggests that gel-processing of conjugated polymers in PE may lead to orientation of the conjugated polymer component.

EXAMPLE 2

Decalin (decahydronaphthalene, Aldrich); 9.7 g was mixed, at room temperature, with 200 mg of polydodecylthiophene in a 50 ml test tube. This stirred mixture was blanketed with nitrogen gas and heated to 104° C., at which time 200 mg of ultra-high molecular weight polyethylene (Hostalen GUR 415, Hoechst) was added. Subsequently, the mixture was heated to a temperature of 115° C., at which point stirring was stopped, and the temperature Was raised further to 150° C. for 1 hour. A Viscous orange liquid was obtained. The solution was cooled, and the red-orange gel was transferred to a laboratory-scale spinning apparatus. A polyethylene/polydodecylthiophene gel fiber was spun according to standard procedures at 105° C. in air.

This material is drawn in accord with the invention and exhibits the orientation properties observed in Example 1.

EXAMPLE 3

The materials of Examples 1 and 2 are nonconducting. They are doped at 40° C. in a 1.75%wt. solution of NOSbF6 and in iodine vapor as representative methods and found to be conductive.

EXAMPLE 4

Decalin (decahydronaphthalene, Aldrich); 9.7 g was mixed, at room temperature, with 200 mg of polydodecylthiophene in a 50 ml test tube. This stirred mixture was blanketed with nitrogen gas and heated to 104° C., at which time 200 mg of ultra-high molecular weight polyethylene (Hostalen GUR 415, Hoechst) was added. Subsequently, the mixture was heated to a temperature of 115° C., at which point stirring was stopped, and the temperature was raised further to 150° C. for 1 hour. A viscous orange liquid was obtained. The solution was cooled, and the red-orange gel was transferred to a laboratory-scale spinning apparatus.

This material is distorted, by drawing in accord with this invention.

What is claimed is:

1. A process for forming an oriented conjugated polymer-containing shaped article comprising the steps of
   (a) providing a carrier solution comprising (i) carrier solvent, (ii) nonconjugated flexible-chain carrier polymer and (iii) conjugated polymer or conjugated polymer precursor;
   (b) gelling and forming said carrier solution and removing solvent therefrom thereby yielding a body having a first shape; and
   (c) anisotropically distorting the first shape of the body to yield the oriented conjugated polymer-containing shaped article characterized by having both nonconjugated flexible chain polymer and conjugated polymer is oriented form and by exhibiting anisotropic absorption and photoluminescence.

2. The process of claim 1 wherein in (c) the anisotropically distorting is accomplished by drawing.

3. The process of claim 2 wherein the drawing is to a draw ratio greater than 30.

4. The process of claim 2 wherein the drawing is to a draw ratio greater than 50.

5. The process of claim 1 wherein the carrier solution comprises
   (i) carrier solvent,
   (ii) from about 0.2% to about 60% by weight, basis solvent, of carrier polymer, and
   (iii) from about 0.2% to about 90% by weight, basis carrier polymer plus conjugated polymer, of conjugated polymer.

6. The process of claim 1 wherein the carrier solution comprises
   (i) carrier solvent,
   (ii) from about 0.2% to about 10% by weight, basis solvent, of carrier polymer, and
   (iii) from about 0.5% to about 25% by weight, basis carrier polymer plus conjugated polymer, of conjugated polymer.

7. The process of claim 1 wherein in step (b) gelling occurs before forming.

8. The process of claim 1 wherein in step (b) gelling occurs after forming.

9. The process of claim 1 wherein the carrier polymer is ultra-high molecular weight polyethylene.

10. The process of claim 9 wherein the conjugated polymer is MEH-PPV.

11. The process of claim 9 wherein the conjugated polymer is a poly(3-alkylthiophene).

* * * * *